United States Patent [19]

Nunnally, Jr.

[11] 3,941,265

[45] Mar. 2, 1976

[54] LOADING APPARATUS FOR ROUND BALES

[76] Inventor: Marion Diehl Nunnally, Jr., Rte. 4, Jacksonville, Tex. 75766

[22] Filed: Dec. 2, 1974

[21] Appl. No.: 528,911

[52] U.S. Cl. .................... 214/505; 172/19; 214/78; 214/518; 242/86.5 R
[51] Int. Cl.² ............................................. B60P 1/44
[58] Field of Search............. 214/77 R, 78, 79, 152, 214/350, 353, 518, 501, 504, 505, DIG. 4; 242/86.5 R, 86.52, 86.6; 172/19, 20; 47/9

[56] References Cited
UNITED STATES PATENTS

| | | | |
|---|---|---|---|
| 1,058,969 | 4/1913 | Hauser................................. | 214/78 |
| 1,225,031 | 5/1917 | Heiden............................ | 214/353 X |
| 1,381,585 | 6/1921 | Nelson.................................. | 214/78 |
| 2,405,755 | 8/1946 | Rodefeld............................. | 214/78 |
| 2,869,284 | 1/1959 | Abernathy et al....................... | 47/9 |
| 3,779,208 | 12/1973 | Gay..................................... | 119/1 R |
| 3,861,616 | 1/1975 | Dubberke..................... | 242/86.5 R |

FOREIGN PATENTS OR APPLICATIONS 584,291   10/1958   Italy...................................... 214/78

*Primary Examiner*—Robert J. Spar
*Assistant Examiner*—Leslie J. Paperner
*Attorney, Agent, or Firm*—Howard E. Moore; Gerald G. Crutsinger

[57] ABSTRACT

Apparatus for loading and unloading round bales of hay and other feed comprising a set of lifting forks which lift the bale off the ground and onto the floor of a wagon. The floor is moveable to an inclined plane such that the round bales will roll off the incline toward the forks and may be deposited on the ground. The apparatus has a tailgate which will trap the round bale within an opening in the wagon and against the ground so as to distribute the hay on the ground as the wagon is pulled forward.

6 Claims, 2 Drawing Figures

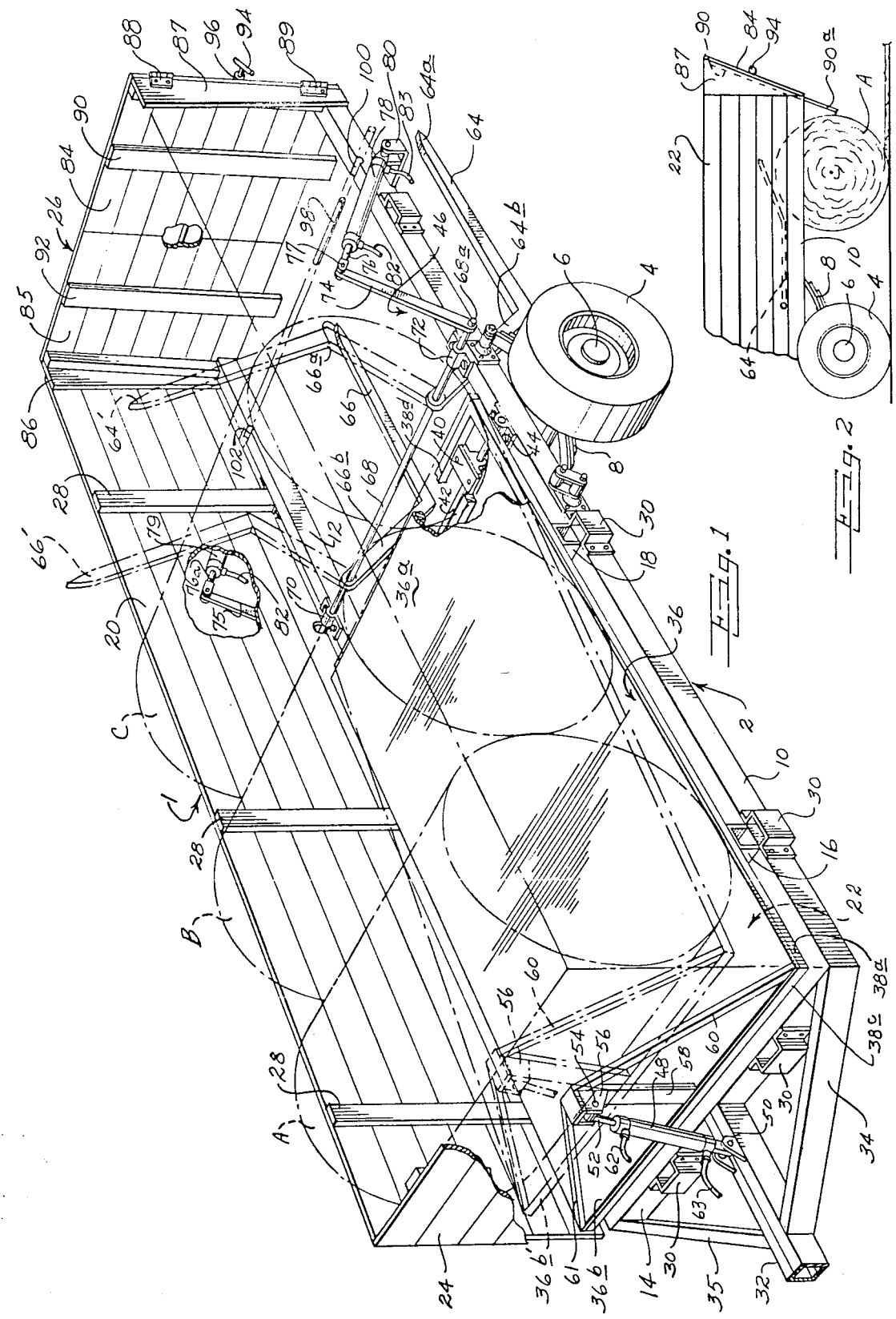

LOADING APPARATUS FOR ROUND BALES

BACKGROUND OF THE INVENTION

In recent years due to shortages in baling wire and man power, farmers and cattlemen have begun harvesting grass type feeds into large, round bales which weigh between 1,200 and 1,500 pounds. These bales of feed, unlike their small square predecessor, cannot be lifted by a single man or easily transported to a storage place with present day equipment.

In addition to pickup and storage problems, distribution of the hay to the livestock is difficult because of the bulk and size of the hay bales. Hay must be distributed over the ground so that livestock may have access to the hay without crowding each other, or fights may occur between the livestock. Heretofore, no device has been devised for specifically handling the large bales of hay.

SUMMARY OF THE INVENTION

I have devised a device to load round bales of grass feed comprising a wagon frame having power assisted forks which slide under the large bales and lift the bales onto the floor of the wagon. The wagon floor is pivotal about a support bar to create an inclined plane so that the bales may be rolled toward the forks for unloading same with the forks. In addition, a tailgate on the wagon may be moved behind the bale and locked in place to secure the bale in front of the tailgate in the opening between the floor and tailgate so that as the wagon is pulled forward the bale will roll along the ground to distribute a blanket of hay or feed in a manner which livestock may eat.

The primary object of the invention is to provide a method of loading large bales of feed for transportation to a storage facility.

Another object of the invention is to provide a method of unloading large bales of feed once they have been transported to a storage facility.

Another object of the invention is to provide a method of distribution of bulky, large bales of hay so that livestock may eat same.

A still further object of the invention is to provide a method of transporting the bales of feed which is readily adaptable to present day farm equipment.

Other and further objects of the invention will become apparent upon referring to the detailed description hereinafter following and to the drawings annexed hereto.

DESCRIPTION OF THE DRAWINGS

Drawings of a preferred embodiment of the invention are annexed hereto so that the invention may be better and more fully understood, in which:

FIG. 1 is a perspective view of the bale loading apparatus with parts broken away to more clearly illustrate the invention; and FIG. 2 is a diagrammatic view of the loading apparatus illustrating the relative positions of a bale and the tailgate of the apparatus while a bale is being unrolled to feed animals.

Numeral references are employed to designate like parts throughout the various figures of the drawings.

DESCRIPTION OF A PREFERRED EMBODIMENT

The bale loading apparatus 1 is mounted on a wagon chassis 2 having wheels 4 secured to an axle 6. The axle 6 is secured to standard leaf springs 8 which are secured to a chassis 2. The chassis 2 is comprised of two longitudinal chassis members 10 and 12 which are spaced from one another by front transverse chassis member 14 and transverse braces 16 and 18.

The chassis 2 has sideboards 20 and 22 secured longitudinally along chassis members 10 and 12. End board 24 is mounted transverse to side boards 20 and 22 on chassis member 14 and tailgate means 26 is secured across the end of chassis members 10 and 12 of the chassis 2. The sideboards 20 and 22 and end board 24 are removeably secured to the chassis 2 by means of cross-braces 28 being slideably disposed in sleeves 30 rigidly secured to the longitudinal chassis members 10 and 12 and the front transverse chassis member 14 by means of rivets or the like.

Extending outwardly from the front transverse chassis member 14 is a wagon tongue 32 to which trailer hitch-up means (not shown) may be attached for connecting the bale loader 1 to a vehicle. Braces 34 and 35 are secured between the chassis member 14 and tongue 32 to give rigidity thereto.

A floor 36 extending from the front transverse member 14 to a point over axle 6 is secured to a frame 38 having longitudinally extending side members 38a and 38b spaced apart and secured to transverse members 38c and 38d. The floor 36 is rigidly secured to pillow blocks 40 which are rotatably disposed on axle 42. Axle 42 is journalled through pillow blocks 44 which are secured to longitudinal chassis members 10 and 12 so that floor 36 is pivotable about axle 42. An opening 46 is formed in the rear portion of the bale loading apparatus 1 between end 36a of floor 36 and chassis members 10 and 12 and tailgate 26. It should be readily apparent that floor 36 may be moved such that end 36a rotates about axle 42 and an inclined plane is formed by raising end 36b to a position 36b'.

Means to lift end 36b of floor 36 comprises a hydraulic cylinder 48 pivotally secured to tongue 32 at one end by a pin 50. Hydraulic cylinder 48 has a piston rod 52 pivotally secured by pin 54 to a clevis 56 which is secured to arm 58 which extends upwardly from end 36b of floor 36. Arm 58 has braces 60 and 61 secured thereto extending downwardly to floor 36 to add rigidity thereto.

Hydraulic cylinder 48 has line 62 communicating with the inside thereof above the piston (not shown) to which piston rod 52 is secured such that when pressure is applied from a pump (not shown) through line 62, and line 63 is vented, rod 52 will be retracted, and floor 36 will be lowered. Line 63 communicates with the bottom of the cylinder below the piston such that when pressure is applied through line 63, and line 62 is vented, piston rod 52 will be extended, raising floor 36 to position 36b'.

Feed such as hay, alfalfa, or the like is formed into cylindrical bales A, B, and C by machinery not shown, as such machinery is not the subject of this application. The bales A, B, and C, in dashed outline, are rolled onto floor 36 and retained there by sideboards 20 and 22 and end board 24. It should be readily apparent that when floor 36 is raised to the inclined position 36b' the bales A, B, or C will roll toward end 36a and opening 46.

Means to lift the bales comprises forks 64 and 66 having ends 64a and 66a which when lowered lie parallel to the ground and extend outwardly from ends 64b and 66b. Ends 64b and 66b of forks 64 and 66 are rigidly secured to a bar 68 which is journalled through pillow blocks 70 and 72 which are rigidly secured to longitudinal chassis members 10 and 12 by means of bolts or the like. End 68a of bar 68 has one end of lever arm 74 rigidly secured thereto. The other end of lever arm 74 is pivotally secured to piston rod 76 by means of pin 77. Piston rod 76 is slideably disposed in hydraulic cylinder 78. The opposite end of cylinder 78 is pivotally secured to clevis 80 which is rigidly secured to frame member 10. Hydraulic cylinder 78 has line 82 which is connected to a pressure pump (not shown) communicating with the upper end of the cylinder such that when pressure is applied through line 82, rod 76 is retracted, pulling lever arm 74 in a clockwise direction which rotates fork 64 and 66 to the lowered position adjacent the ground. Line 83 communicates with the pump (not shown) and the lower end of the cylinder such that when pressure is applied through line 83, rod 76 is extended, moving lever arm 74 in a counterclockwise direction which rotates forks 64 and 66 to positions 64' and 66' shown in dashed outline.

Lever arm 75, hydraulic cylinder 79, and piston rod 76a are secured to end 68b of bar 68 in a similar manner to that of lever arm 74 and hydraulic cylinder 78.

Forks 64 and 66 are positionable under a cylindrical bale A on the ground by backing the bale loading apparatus 1 towards the cylindrical bale A. Once the ends 64a and 66a of forks 64 and 66 are under the bale A, the hydraulic pressure means (not shown) is activated to pressurize lines 83 to extend rods 76 and 76a of hydraulic cylinders 78 and 79 thus moving forks 64 and 66 to the position shown in dashed outline 64' and 66' such that the bale A shown in dashed outline is moved onto floor 36.

Tailgate 26 has two doors 84 and 85 pivotally secured to vertically extending end members 86 and 87 of sideboards 20 and 22 by means of hinges 88 secured to the upper portions of doors 84 and 85 and hinges 89 secured to the lower portions of doors 84 and 85. Vertically extending members 86 and 87 are rigidly secured to the end of chassis members 10 and 12. Doors 84 and 85 have downwardly extending posts 90 and 92 located centrally on each door and having ends 90a and 92a extending below the level of the chassis members 10 and 12. The doors 84 and 85 are locked closed by means of a rod 94 which is slideably disposed through rings 96 secured transversely across doors 84 and 85.

As best illustrated in FIG. 2, the doors 84 and 85, forming tailgate 26, are positioned such that lower ends 90a and 92a of posts 90 and 92 are inclined from a vertical plane toward the front end of the wagon. If the rolling bale encounters an obstruction, such as a rock, on the ground, it will be noted that the inclined posts 90 and 92 exert a lifting force on the bale below the center of the bale to elevate the bale over the obstruction.

A safety bar 98 extends transversely from chassis member 10 to chassis member 12 and is slideably disposed in notches 100 and 102 so that upon transporting the bale loader 1 the forks 64 and 66 are positioned against the upper side of bar 98 to prevent them from contacting the surface of the roadway and to prevent imposing excessive force on cylinders 78 and 79.

Operation of the hereinbefore described device is as follows:

To pick up a bale of feed A, the tailgate doors 84 and 85 are opened and the bale loading apparatus 1 is backed toward the bale A. The bale A is maneuvered into the opening 46 between chassis members 10 and 12 and the forks 64 and 66 are positioned under the bale A. Hydraulic lines 83 are then pressurized to extend piston rods 76 and 76a outwardly rotating lever arms 74 and 75 in a counter-clockwise direction which lifts forks 64 and 66 to the position 64' and 66' shown in dashed outline thus positioning bale A onto floor 36. The bale A is rolled toward end board 24. This process may be repeated until the floor 36 is filled to capacity with bales A, B, and C.

It should be readily apparent that as ends 64a and 66a of forks 64 and 66 move upwardly, they move in an arc such that when raised off the ground they are moved in an increasing angle from the ground upwards to prevent bale A from rolling off the forks 64 and 66.

To unload the bales A, B, or C, the tailgate 26 is opened and floor 36 is raised as previously described to position 36b' rolling bale C against the upwardly extending forks 64 and 66. Floor 36 is then lowered and the bale C is lowered to the ground by forks 64 and 66. Bale loading apparatus 1 is then moved forward, the floor 36 raised and another bale B rolled toward the upwardly extending forks 64 and 66 and lowered to the ground. This procedure is repeated until the wagon is unloaded.

To distribute the hay on the ground so that the cattle may have access thereto, the forks 64 and 66 are raised to the upward position 64' and 66' and the trailer is backed around a bale A such that the bale A is positioned in opening 46 between the longitudinal chassis members 10 and 12. The tailgate doors 84 and 85 are then closed and locked by means of rod 94. The bale loader 1 may then be pulled forward with the bale A still in contact with the ground and forks 64 and 66 positioned on the upper surface of bale A to maintain pressure on the bale forcing same against the ground. Posts 90 and 92 extend below the central point of the bale A such that edge A' of bale A is adjacent posts 90 and 92 which move the bale A when the bale loader 1 is moved forward. As the bale loader 1 is moved forward it rotates the bale A unrolling feed from the bale along the ground in a blanket type layer until the desired amount of feed has been distributed to the livestock. If desired, the bale may then be picked up and transported to another part of the pasture or placed back in storage in a manner hereinbefore described.

It should be readily apparent that the apparatus herein described provides a method of handling bulky bales of feed without requiring human manipulation of the bales which weigh between 1,200 and 2,000 pounds.

It should be readily apparent that other and further embodiments of the invention may be devised without departing from the basic concept thereof.

Having described my invention, I claim:

1. Bale handling apparatus comprising: a vehicle having a front end and a rear end; a floor; means pivotally securing the rear end of said floor to said vehicle; said floor terminating intermediate the front and rear ends of the vehicle; elevating means secured between said vehicle and the front end of said floor; spaced forks; means pivotally securing said forks to said vehicle adjacent the rear end of the floor; actuating means secured between said vehicle and said forks, said actuating means being adapted to pivot said forks between a first position wherein ends of said forks are adjacent the ground and a second position wherein ends of said forks are at an elevation above said floor; bale engaging means; and means securing said bale engaging means to the rear end of said vehicle, said bale engaging means extending transversely of said vehicle and rearwardly of ends of said forks such that an opening is formed between the rear end of the floor and the bale engaging means, said forks being movable through said opening.

2. The combination called for in claim 1 wherein the bale engaging means comprises: spaced posts; a tailgate having said posts secured thereto; and means securing said tailgate to extend transversely across the rear end of said vehicle.

3. Bale handling apparatus comprising: a vehicle having a front end and a rear end; a floor; means securing said floor to said vehicle; said floor terminating intermediate the front and rear ends of the vehicle; spaced forks; means pivotally securing said forks to said vehicle adjacent the rear end of the floor; actuating means secured between said vehicle and said forks, said actuating means being adapted to pivot said forks between a first position wherein ends of said forks are adjacent the ground and a second position wherein ends of said forks are at an elevation above said floor; spaced posts; a tailgate having said posts secured thereto; and means secured to said vehicle and to said tailgate arranged to position lower ends of said posts below said floor and intermediate the front and rear ends of said vehicle such that said posts are inclined relative to a vertical plane, said tailgate extending transversely of said vehicle and rearwardly of ends of said forks.

4. The combination called for in claim 3 wherein said means securing said floor to said vehicle comprises: pivot means securing a rear end of said floor to said vehicle; and elevating means secured between said vehicle and said floor, said elevating means being adapted to pivot said floor about said pivot means.

5. The combination called for in claim 4 wherein said elevating means comprises: a pressure actuated cylinder having a piston slidably disposed therein; a rod extending outwardly from one end of said cylinder; means pivotally securing said cylinder to said vehicle; means pivotally securing said rod to said floor; and means to pressurize said cylinder.

6. The combination called for in claim 5 wherein said actuating means comprises: a pressure actuated lift cylinder having a piston slidably disposed therein; a rod extending outwardly from one end of said lift cylinder; means pivotally securing said lift cylinder to said vehicle; means pivotally securing said rod to said forks; and means to pressurize said lift cylinder.

* * * * *